United States Patent [19]

Gunnarshaug

[11] Patent Number: 4,733,506
[45] Date of Patent: Mar. 29, 1988

[54] SOLAR ENERGY CONTROLLABLE ROOF STRUCTURE

[76] Inventor: Olav J. Gunnarshaug, Tonstadgrend 5, N-7075 Tiller, Norway

[21] Appl. No.: 913,663
[22] PCT Filed: Jan. 31, 1986
[86] PCT No.: PCT/NO86/00010
 § 371 Date: Sep. 25, 1986
 § 102(e) Date: Sep. 25, 1986
[87] PCT Pub. No.: WO86/04632
 PCT Pub. Date: Aug. 14, 1986

[30] Foreign Application Priority Data

Jan. 31, 1985 [NO] Norway ................ 850371

[51] Int. Cl.[4] .................. E04D 13/18; F24J 2/00
[52] U.S. Cl. ............................... 52/22; 52/66; 52/168; 52/173 R; 52/729; 126/419; 126/429; 126/431; 126/438
[58] Field of Search .............. 52/18, 22, 66, 168, 52/690, 729, 173 R; 126/431, 429, 419, 438

[56] References Cited

U.S. PATENT DOCUMENTS

| Des. 157,994 | 4/1950 | Palmer | 52/729 |
|---|---|---|---|
| 504,544 | 9/1893 | Van Der Heyden | 52/168 X |
| 2,595,905 | 5/1952 | Telkes | 126/419 |
| 3,362,056 | 1/1968 | Preller et al. | 52/729 X |
| 4,191,243 | 3/1980 | Donzis | 52/168 X |
| 4,216,762 | 8/1980 | Klaila | 52/168 X |
| 4,219,008 | 8/1980 | Schultz | 126/419 |
| 4,223,662 | 9/1980 | Lunde et al. | 126/424 |
| 4,418,684 | 12/1983 | Sanders et al. | 126/419 |
| 4,461,277 | 7/1984 | Pardo | 126/419 |
| 4,552,212 | 11/1985 | Nuttle | 126/438 X |

FOREIGN PATENT DOCUMENTS

| 2815268 | 9/1979 | Fed. Rep. of Germany | 52/18 |
|---|---|---|---|
| 2819901 | 11/1979 | Fed. Rep. of Germany | 52/18 |
| 2267531 | 11/1975 | France | 126/429 |
| 2411284 | 8/1979 | France | 52/18 |
| 2036150 | 6/1980 | United Kingdom | 52/729 |

Primary Examiner—Alfred C. Perham
Attorney, Agent, or Firm—James E. Pittenger

[57] ABSTRACT

Roof structure for transparent roofs with girders (11), each with a solar panel (15, 36). The girders preferably have a height equal to have the distance between each girder. Two trapdoors (13, 14), consisting of thermal insulating material (28), are located between each pair of girders, one on the underside of each girder, which can swing on its pivot axis on the girder between horizontal and vertical positions. In the horizontal position the trapdoors shield against heat loss, in the vertical position they allow all light to enter, and in the intermediate position incoming light is reflected towards the sides of the girders (15) for heat absorbtion.

7 Claims, 7 Drawing Figures

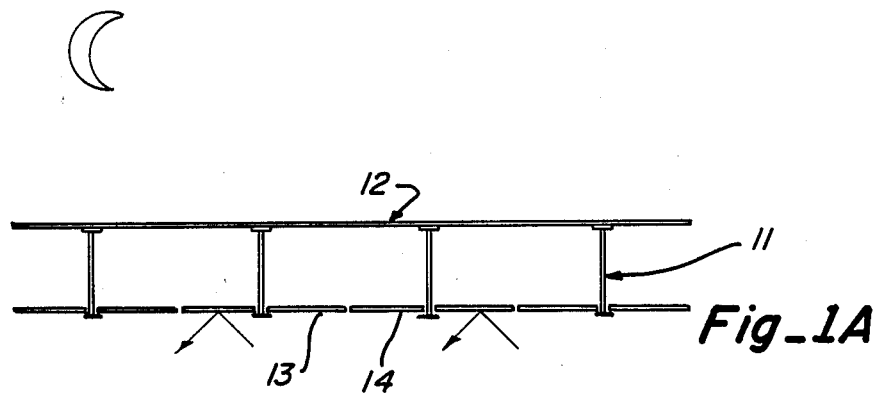
Fig_1A
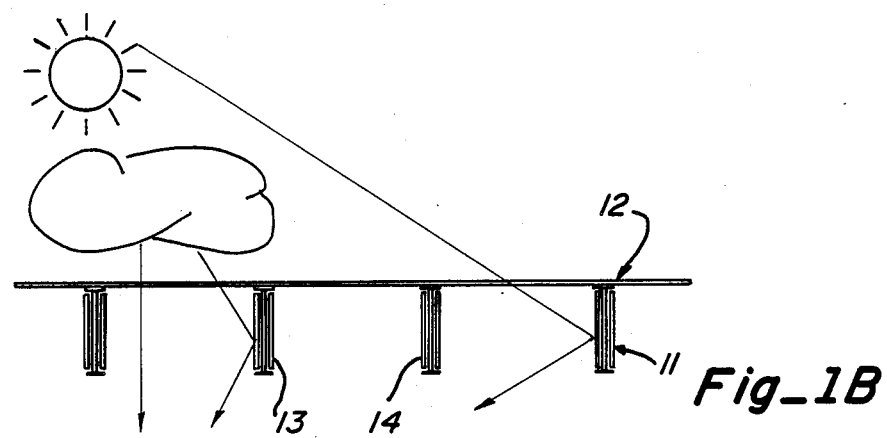
Fig_1B
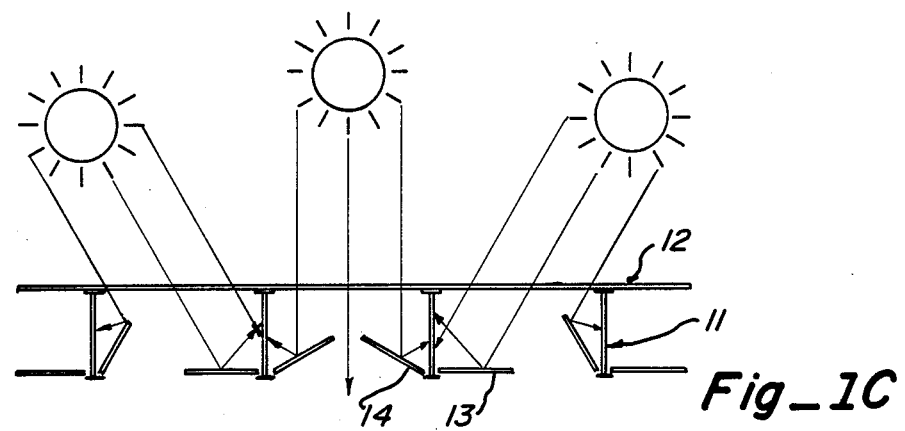
Fig_1C

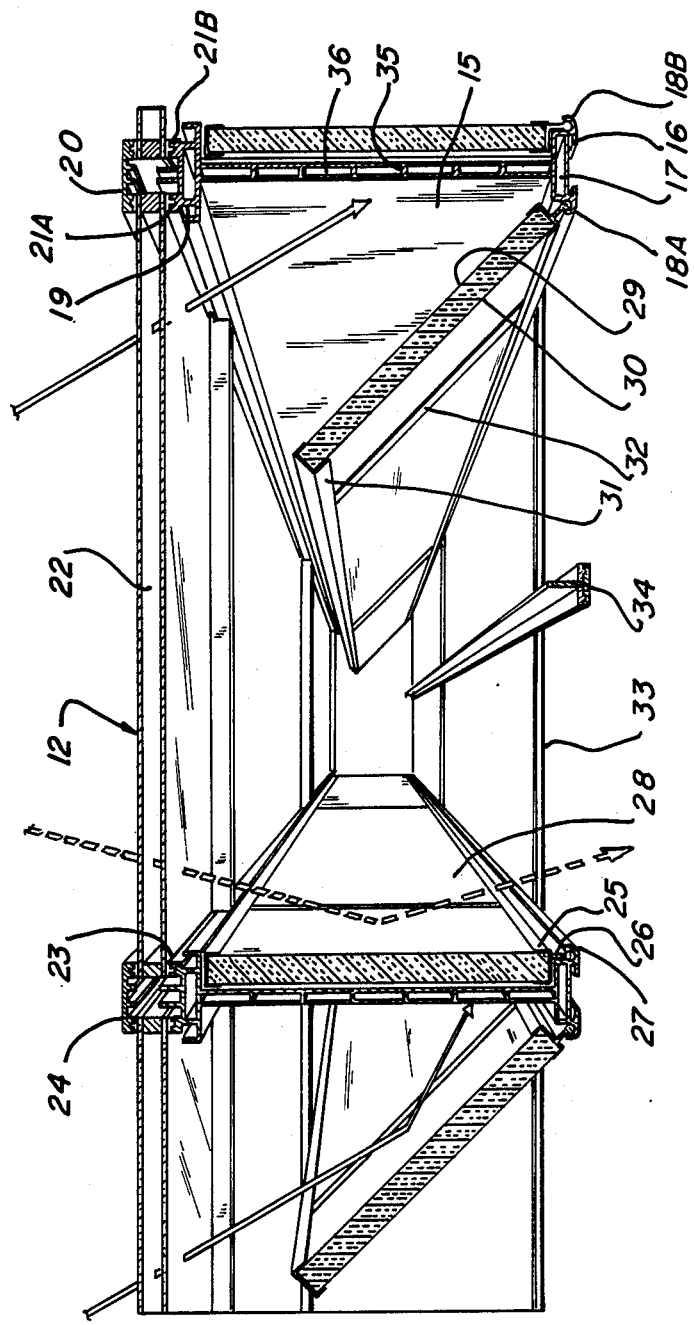
Fig_2

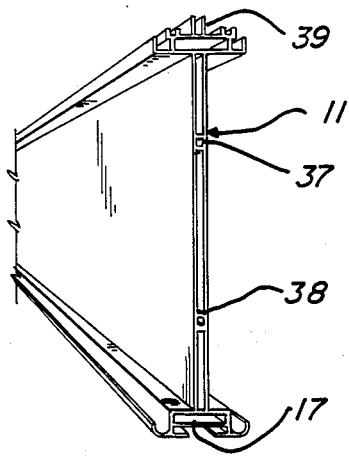
Fig_3A
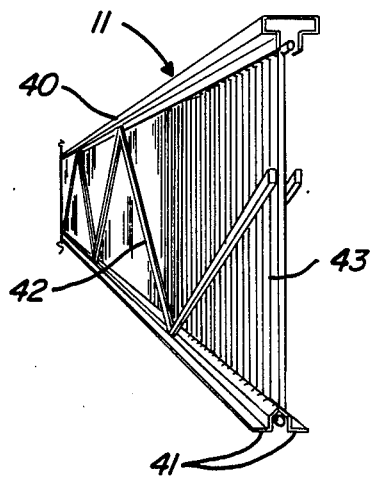
Fig_3B
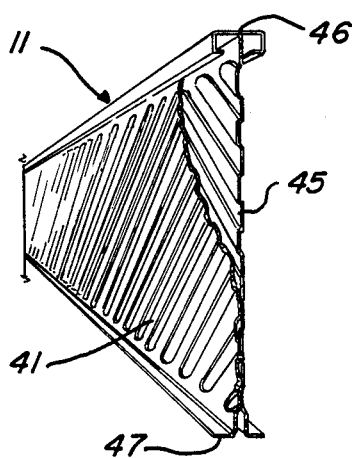
Fig_3C

SOLAR ENERGY CONTROLLABLE ROOF STRUCTURE

PRIOR ART

The invention concerns a roof structure of the type that is presented in the introduction to claim 1.

DISADVANTAGES OF PRIOR ART

Large glass roof structures create indoor climatic problems compared with light-proof construction. This is partly due to the relatively bad thermal insulating ability of glass and partly due to the variability of the sun rays. The low thermal insulating ability creates a large heat loss in periods of low solar energy. During the summer months the sun rays will provide an excess of heat and high temperatures. This has made it necessary to accept greater variations in temperature than desirable with such roof structures.

Such roof structures have also been used to cover areas between buildings to create partially climatized zones and to reduce heat loss from the buildings. This solution is designed solely for larger areas and the costs are high compared to their usefulness.

THE OBJECT OF THE INVENTION:

The main object of this invention is to create a roof structure that provides the possibility for good thermal economy compared to initial expenses. It is of special interest to create a roof structure that allows for the possibility of function change: during periods of high solar intensity a shielding of the sunrays can take place, while during periods without incoming of light and with low outdoor temperatures insulation can be obtained. Moreover, one object of the invention is to be able to preserve the warmth of the sun through a solar panel integrated within the roof structure. In addition to this, financial considerations and certain esthetic qualities are required.

BRIEF DESCRIPTION OF THE DRAWINGS

The invention will be described in closer detail in the following by reference to the drawings where:

FIG. 1A-C illustrates a schematic vertical section through a roof structure shaped in accordance with the invention during various operating conditions, FIG. 2 shows a perspective vertical section through one embodiment of a roof structure according to the invention, and FIG. 3A-C shows alternative girder types.

DESCRIPTION OF THE INVENTION

The roof structure in FIG. 1A-C encompasses a number of parallel girders 11 in which four are shown in the example. The design of the girders will be described in closer detail in the example below. A glass roof lies over the girders, and this roof is generally signified by the reference number 12. This will also be described in more detail below. In the example the girders 11 are constructed with a height that is equal to half the distance between the girders. On the underside of each girder 11 a pivoted trapdoor is connected, 13 and 14 respectively, which can swing between a lower, generally horizontal position and an upper position up to the girder. The pivoted trapdoors will be described in more detail below.

FIG. 1A illustrates the roof structure in the example with all the trapdoors 13 and 14 in the lower position. This can be called "the night position" due to the fact that no light will be let in or out through the roof structure, and at the same time will allow maximum thermal insulation. The insulating ability increases because the trapdoors 13 and 14 are manufactured with insulating materials, as described below.

In FIG. 1B the roof structure in the example is illustrated with the trapdoors swung upwards to give maximum incoming light. This condition is relevant in periods with moderate incoming light where it is desireable to utilize all of the incoming sunlight to heat the space under the roof structure. With suitable designing of the surfaces of the trapdoors, as described below, a high degree of reflection of the light that falls against the trapdoors will be achieved. This operating condition is also relevant in overcast or cold weather, in that it utilizes the incoming light, allowing maximum effect.

FIG. 1C illustrates the third operating condition for the roof structure in the example: in the instance of strong incoming sunlight and hot weather. In this case it is unnecessary and undesireable to let the heat from the sun enter into the inner space under the roof structure. In this case the trapdoors 13 and 14 are swung in such a way that they collect the light rays and reflect them towards the vertical girder 11, where a solar panel is connected.

An operating condition with sunlight incoming at an angle from the left is shown on the left of the figure, incoming sunlight symmetrically positioned between the two girders is shown in the middle of the figure, while on the right an operating condition is shown for incoming sunlight entering at an angle from the right.

Movement of the trapdoors 13 and 14 can be accomplished with the help of motors (not shown) driven by a suitable guidance system. This can be designed by known methods and thus shall not be described in further detail herein. In all of the three cases a major part of the incoming sunlight will be reflected and thrown towards the sides of the girders 11.

FIG. 2 illustrates a more detailed example of the design in accordance with the invention. The girders 11 are made of extruded aluminum with black side surfaces 15. The girders 11 have a lower flange 16 that forms a horizontal longitudinal chamber 17. A longitudinal gutter, 18a and 18b respectively, with an arcuate profile runs along each side of the flange 16. The gutters 18a, b are designed to receive a corresponding part on a trapdoor 13, 14, as will be described below.

At the top, the girder 11 is correspondingly supplied with a flange 19 that enters a chamber 20. At the top there are two grooves 21A and 21B for placement of a glass structure, such as described below.

An overlying insulating glass 22 is placed between each pair of neighboring girders. A gasket 23 intervening on the adjacent groove 21A or 21B is placed between the edge of the insulating glass 22 and the adjacent flange 19. The glass plates 22 are held in place with the help of clamping strips 24 fastened by a suitably known method over the space between two adjacent glass plates.

The trapdoors 13 and 14 in the example encompass an inner U-shaped contour with a rib 26 on the outside of the web which with the free edge is provided with a swinging bar 27 intended for lying in the track or gutter, 18A or 18B. The main section in each trapdoor 13 and 14 is an insulating plate 28. The insulating plate 28 can be manufactured from mineral wool, foamed plastic, or in another suitable way. The side surfaces 29 that faces the girders 11 consist of a strong, reflecting material, for example, aluminum foil. The side surface 30 that faces the inside of the building are either of a reflecting nature or white, to create a diffuse light that is thrown into the space inside. The free edge of each trapdoor 13 and 14 is provided with a U-shaped edge 31. The edges 25 and 31 can be held together by two or more supporting rails 32. The trapdoors 13 and 14 are dimensioned so that they fit between the flanges 16 and 19 of each girder while in the upward position.

Between the girders the underside crosswise running bars 33 are fastened, which bear a T-shaped supporting rib 34, which is located centrally between each pair of girders. The purpose of the supporting rib 34 is to hold the trapdoors 13 and 14 when they are in the downward position.

The girder 11 is designed with double cheeks or sides with longitudinal, spaced ribs 35. In the example in FIG. 2 the inside of the girder is divided into 7 longitudinal chambers 36 with six such spaced ribs 35. In this way a through flow system for water is realized with the help of suitable connections on the ends (not shown). This creates an integrated solar panel in each girder 11. The black cover 15 and the leading aluminum material in the girder sidewalls insure effective absorption and transference of the heat energy. Such a solar panel can be connected by known methods to a heat storage cell and an installation for transferring the heat to the underlying space.

Alternatives:

Both the general roof structure and design of the elements in the example in FIG. 2 can be varied in different ways.

FIG. 3A–C illustrates alternate girder formations.

FIG. 3A illustrates an aluminum girder of extruded material that corresponds to the girder 11 in FIG. 2, with the difference being that instead of passages 36 (FIG. 2), there are two pipes 37 and 38 integrated into the girder structure in the space between the double girder cheeks. Moreover, the girder in FIG. 3A corresponds to the girder in FIG. 2 in that the chambers 17 and 20 are filled with insulating material. At the top of the girder two central ribs protrude in a similiar way as in FIG. 2.

FIG. 3B illustrates a girder 11 that is based on a lattice girder with an upper closed contour 40, a lower double angle section 41 and diagonal girders 42 on both sides. An energy panel 43, which can be of known design, is placed between the girders 42.

FIG. 3C illustrates a third alternative for the girder 11. In this example the girder consists mainly of two corrugated plates 44 and 45, which, between them defines the panel canals. In the corrugated plates 44 and 45 water pressure and shearing forces can be received, due to the fact that they are suitably supplied with an upper and lower flange, 46 and 47 respectively.

Elements for supporting trapdoors and the like are not shown because they can be designed as previously described.

The trapdoors 13 and 14 can be designed using other materials than those shown in FIG. 2. They can, for example, be made of insulating glass, with a semi-transparent, metallized, plastic film between the glass layers, or with an aluminum laminate with an insulating effect.

As an alternative to the pivoted trapdoors illustrated in FIGS. 1 and 2, a system with shades or flexible tracks that can be pulled for alternating the opening between the girder and the girder sides 15 can be used.

Instead of horizontal glass plates 22, the invention can also be utilized in a roof structure with saw-toothed contours.

I claim:

1. A roof structure for transparent roofs, consisting of a number of support girders, wherein at least a part of each girder includes a sheet-formed solar panel which is operatively connected to a heat exchanger for a medium for heat transference, characterized by the fact that the solar panel is connected to a side surface of the girder and that the solar panels are designed for receiving a fluid that can transfer heat, and that in the space between two girders is placed at least one element means, said element means having an upward-facing reflecting side and including means for moving it between various positions in relation to the solar panel and the opening between adjacent girders.

2. A roof structure, in accordance with claim 1, characterized by the fact that the element means is journaled, for movement between a position which closes the space between adjacent girders and a position where it covers the solar panel on the adjacent girder.

3. A roof structure, in accordance with claim 2, characterized by the fact that the element means is one or more trap doors that are pivoted on a side edge of a lower flange of the adjacent supporting girder in such a way that the trap door can swing between a horizontal and a vertical position.

4. A roof structure in accordance with claim 3, characterized by the fact that the trap door includes an insulating cover.

5. A roof construction in accordance with claim 1 characterized by the fact that the element means consists of a rolled flexible reflecting material that has a light-proof section, and said moving means includes a drive means whereby the rolled material can be alternately positioned over the space between two adjacent girders and in front of a solar panel.

6. A roof structure in accordance with claim 1 characterized by the fact that the solar panel consists of two corregated sheets joined at their outer edges that together make up the sides of the girder.

7. A roof structure, in accordance with claim 1, wherein the girder is a lattice girder having diagonal side cross beams, characterized by the fact that the solar panel is located between the diagonal side cross beams.

* * * * *